Nov. 24, 1959
E. W. S. NICHOLSON
2,914,463
USE OF FLUIDIZED SOLIDS AND CATALYST PARTICLES IN THE HYDROFORMING OF A NAPHTHA
Filed May 28, 1954
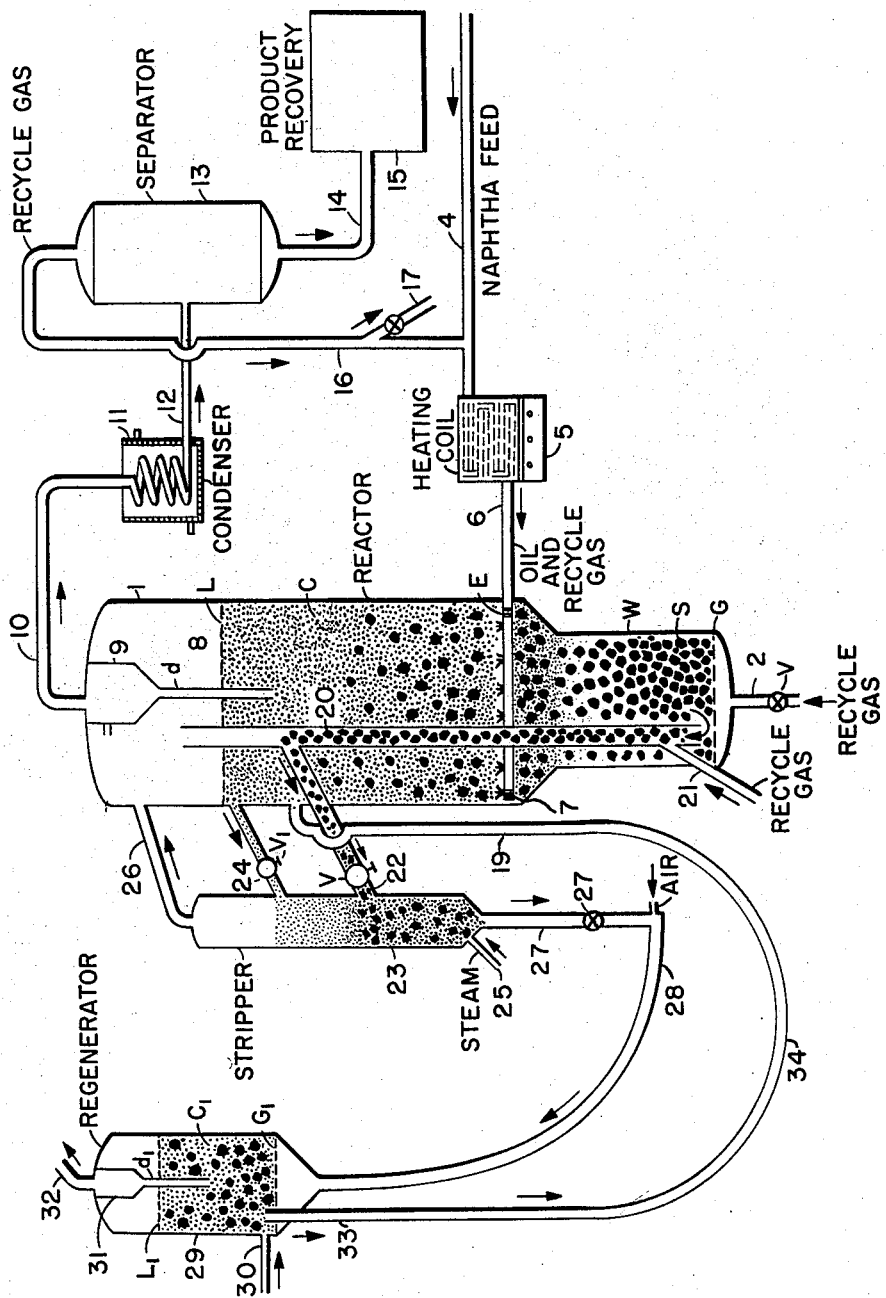
INVENTOR,
EDWARD W. S. NICHOLSON

United States Patent Office 2,914,463
Patented Nov. 24, 1959

2,914,463

USE OF FLUIDIZED SOLIDS AND CATALYST PARTICLES IN THE HYDROFORMING OF A NAPHTHA

Edward W. S. Nicholson, Baton Rouge, La., assignor to Esso Research and Engineering Company, a corporation of Delaware Application May 28, 1954, Serial No. 433,243

8 Claims. (Cl. 208—136)

This invention pertains to the catalytic conversion of hydrocarbon fractions, and particularly, to the conversion of hydrocarbon fractions boiling within the motor fuel boiling range of low knock rating into high octane number motor fuels. Specifically, this invention pertains to an improved process for upgrading hydrocarbon fractions boiling within the motor fuel or naphtha range by hydroforming or aromatizing the same in a fluidized solids reactor system.

Hydroforming is a well known and widely used process for treating hydrocarbon fractions boiling within the motor fuel or naphtha range to upgrade the same or increase the aromaticity and improve the anti-knock characteristics of said fractions. Hydroforming is an operation conducted at elevated temperatures and pressures in the presence of a solid catalyst and hydrogen whereby the hydrocarbon fraction is increased in aromaticity, in isomeric hydrocarbons and otherwise improved in quality as a motor fuel or aviation gasoline. In this operation there is no net consumption of hydrogen. Hydroforming operations are usually carried out at temperatures of 750°–1150° F. in the pressure range of about 50–3000 lbs. per sq. inch and in contact with such catalysts as platinum group metals, or molybdenum oxide or chromium oxide or, in general, oxides and sulfides of metals of groups IV, V, VI, VII and VIII of the periodic system of elements alone, but usually supported on a base or spacing agent such as alumina gel, precipitated alumina or zinc aluminate spinel. Aromatization, a process for converting paraffins into aromatics, is carried out in the presence or absence of hydrogen, utilizing the same general class of catalysts as in hydroforming at temperatures of about 750°–1150° F. but at pressures of from atmospheric to at most about 100 lbs. per sq. inch.

It has been proposed in application Serial No. 188,236, filed October 3, 1950, now U.S. Patent No. 2,689,823, issued September 21, 1954, to effect the hydroforming of naphtha fractions in a fluidized solids reactor system in which naphtha vapors are passed continuously through a dense, fluidized bed of hydroforming catalyst particles in a reaction zone, spent catalyst being continuously withdrawn from the dense bed and passed to a separate regeneration zone where inactivating carbonaceous and other deposits are removed therefrom, whereupon the regenerated catalyst particles are returned to the main reactor vessel. In the process disclosed in said application, the operation has been limited to low catalyst to oil weight ratios (around 1:1) by selectivity considerations since higher ratios resulted in excessive carbon formation. Moreover, high regeneration temperatures have not been possible due to deactivation of the catalyst. These factors limit the transfer of heat from the regenerator to the reactor via the catalyst and make it necessary to provide cooling coils in the regenerator and to provide furnaces or other means for supplying heat to the reactor either directly or indirectly through preheating the reactants and/or the hydrogen-rich recycle gas.

It is an object of this invention to provide a process whereby hydrocarbon fractions boiling within the motor fuel range may be hydroformed or aromatized in a fluidized solids reactor system in which all of the heat released in the regeneration of the spent catalyst particles may be readily transferred from the regeneration vessel to the reaction vessel.

It is a further object of this invention to devise a simple and economical method for transferring the heat of regeneration to the reactor vessel and simultaneously protecting the catalyst from excessively high or inactivating temperatures.

It is a further object of the present invention to transport heat by means of a heat carrier or a heat retention material (hereinafter sometimes called "shot") from the regenerator to the reactor, and in particular, to maintain a high ratio of heat retention material to catalytic material in the circulating solids stream.

These and other objects will appear more clearly from the detailed specification and claims which follow.

The present invention is based on the discovery that the hydroforming of petroleum fractions boiling within the motor fuel boiling range in a system utilizing the fluidized solids technique can be carried out to greater advantage if extraneous inert heat retention material is circulated between the reactor vessel and the regenerator vessel so as to provide the heat required for the reactions in the said reactor.

In prior practice the quantity of inert solids that could be circulated by known methods between the reactor and regenerator was limited to a maximum of about 4 to 6 weights of inert solids to each weight of catalyst circulated. This quantity of inert solids in many cases is insufficient to carry the necessary heat of reaction from the regenerator to the reactor, and the process was thus limited. The present invention provides a method for circulating any desired ratio of inert solids to catalyst, including values of 7 to 15 or much higher if needed.

This is important since it gives the process greater flexibility and adapts it for utilization in the hydroforming of naphtha feeds of various compositions which may thus vary widely in their heat requirements. In accordance with the present invention, a circulating stream of inert fluidized solids is provided to carry the necessary heat from the regenerator to the reactor, and means are provided for varying the ratio of heat retention material to catalyst in the circulating solids stream, the means provided comprising a riser disposed in a fluidized bed of the catalyst, which riser is adapted for recirculating heat retention material from a point at near the bottom of said bed to the top of the bed of fluidized catalyst from which it may be withdrawn and mixed outside the reactor with contaminated catalyst for delivery to the regenerator in any desired ratio.

In the accompanying drawing there is shown a diagrammatic flow plan which indicates a preferred modification of the present invention.

Vessel 1 represents a hydroforming reactor containing a fluidized bed of catalyst C extending from E to an upper dense phase level L. In a manner hereinafter more fully described a heat retention material or shot S comprising, for example, mullite having a particle size of from 300 to 500 microns, is heated with catalyst in a regenerator. The heated shot and catalyst is charged to an upper point in the bed of solids C. The shot descends rapidly through the bed of catalyst, adding heat thereto, and collects in a well W of vessel 1 disposed at the lower end thereof, as shown. Some catalyst passes into well W with the shot and to remove this catalyst from the well W, a small amount of gas is charged to the bottom portion of well W through line 2, which gas passes upwardly through a gas distributor G into the main body of solids in well W and thereafter into the bed of catalyst C, carrying with it catalyst from the said well W, but not any substantial amount of shot S. The actual amount of gas necessary for this purpose can be determined by simple test. The naphtha to be reformed enters the system through line 4 and is heat-exchanged with hot hydroformed product (in means not shown in the drawing) and then further heated to a temperature of about 1000° F. in a suitable furnace. Thus, in the present process the naphtha preheated by heat exchange with the product is mixed in line 4 with recycle hydrogen-containing gas from line 16 and this mixture is charged to furnace 5 wherein it is heated to a temperature of about 1000° F., and this mixture is charged to reactor 1 via line 6 and nozzles 7. It is important to note the oil and hydrogen-containing gas are heated to a temperature not in excess of about 1000° F., a departure from prior practice in that in the conventional process the hydrogen-containing gas is separately heated to a temperature of from about 1200°–1400° F. In this temperature range the hydrocarbons in the hydrogen-containing gas undergo thermal cracking with the formation of coke and unwanted gaseous hydrocarbons. Furthermore, since the oil and hydrogen in the instant process may be heated in a single heating means, whereas, the prior practice required a dual heating means, important economies in plant investment and utilities are achieved by practicing the present invention. Another advantage of heating the oil and hydrogen gas together is that the gas dilution improves the delta T relationship, thus effecting further economies in heat transfer surface. All of the advantages result from the use of high shot to catalyst ratios in the circulating stream between the reactor and the regenerator.

Under conditions of temperature, pressure and contact time which are known in this art, the desired hydroforming reaction occurs and the product vapors emerge from the bed C and pass through a catalyst disengaging space 8 wherein entrained catalyst is separated from the vapors and gravitated toward the bed C. The vapors substantially freed of entrained solids are forced through one or more gas-solids separators 9 wherein catalyst fines still remaining in the vapors are removed and returned to the bed C through one or more dip pipes $d$. The product is recovered overhead from reactor 1 through line 10 and delivered to a product and purification system to recover the hydroformate, hydrogen and other products by conventional means comprising a feed heat exchanger (not shown), thence passed to condenser 11 wherein the raw product is cooled to about 100° F., thence passed via line 12 to a separator 13 from which the liquid product is withdrawn via line 14 and delivered to a finishing still and other conventional equipment indicated at 15, to recover the desired hydroformed product.

A hydrogen-containing gas is withdrawn from separator 13 overhead through line 16, heat exchanged with product vapors in a heat exchanger (not shown), admixed with feed naphtha in line 4, and this mixture is heated in furnace 5 for delivery to reactor 1, as previously explained. Excess recycle gas may be withdrawn from the system through line 17.

To add heat to the reactor, hot catalyst plus shot from regenerator 29 enter the reactor 1 through line 19, as previously indicated. In a manner presently to be described the weight ratio of hot inert heat-carrying solids to catalyst in the stream entering 1 may be maintained at a very high value, up to 15 to 1 or higher. This mixture is, as previously stated, charged to reactor 1 at a point in the upper portion of the bed C. The inert solids are larger and more dense than the catalyst, and as a result, they descend rapidly through the bed while the catalyst, having a size of 20–80 microns, is maintained as a fluidized bed. Hence, the concentration of inert heat-carrying solids in bed C is very small, say, 1 to 3% by volume or 10–15% by weight of the bed C, so that although the said shot gives up a large amount of heat to the hydroforming reaction, it does not occupy a large volume in the reactor and, therefore, does not seriously dilute the catalyst bed.

In the bed of catalyst C, there is disposed a riser tube 20 extending from a point at near the bottom of the well W to a point above the upper dense phase level L of bed C. In the well of the vessel 1 the concentration of the inert heat-carrying material is very high for the upflowing gas in the well serves to remove catalyst by elutriation. The mullite or other inert shot is caused to rise in tube 20 by the injection of hydrogen-containing gas into the bottom of riser tube 20. This carrier gas is injected into the riser through line 21. The heat-carrying material or shot which is virtually free of catalyst is withdrawn from an upper portion of riser 20 through line 22 controlled by a valve and charged into an outside stripper 23. Simultaneously, a catalyst-shot mixture, rich in catalyst is withdrawn from an upper portion of bed C via line 24 also controlled by a valve and charged to the said stripper 23. The material in line 24 will constitute a mixture of shot and catalyst, but since the former is more dense and of greater average particle size than the catalyst, the concentration of catalyst in this region of the bed C is much greater than that of the heat-carrying material. As previously indicated, by manipulating the valves in lines 22 and 24, respectively, the ratio of shot to catalytic material in stripper 23 may be controlled to any desired value, including values of 6 to 15 parts by weight of shot per weight of catalytic material, or higher ratios. In this external stripper 23 the catalyst and heat retention material are treated with a gas to dislodge adsorbed or occluded hydrocarbons and hydrogen associated with the solids in stripper 23. For example, steam may be injected into the bed of solids in stripper 23 via line 25 and caused to flow upwardly countercurrently against the downflowing solids whereby the latter are stripped of said hydrocarbons. The mixture of hydrocarbons, hydrogen and steam passes overhead from stripper 23 via line 26 and is charged into reactor vessel 1 above the dense phase level L of bed C, and this mixture passes out of the reactor with the main product in line 10 to be treated for recovery of desired hydrocarbons. The solids which have been treated in stripper 23 are withdrawn from the stripper through line 27 controlled by a valve and are charged into a stream of air flowing in line 28 and the said solids are carried in suspension into regenerator 29 where again they are formed into a dense fluidized bed $C_1$ extending from a grid $G_1$ to an upper dense phase level $L_1$. Under known conditions of temperature, pressure and residence time, carbonaceous and other contaminaitng materials disposed on the solids are removed by oxidative regeneration, thus, of course, adding sensible heat to the said solids. If a greater amount of heat is desired to be added to the solids, a quantity of torch oil or combustible gas may be fed to the bottom portion of regenerator 29 through feed line 30. It is to be noted that contrary to the general practice regenerator 29 does not contain a cooling coil which is normally used to withdraw heat from catalyst and, therefore, from the system, and hence, substantially all of the heat released in regenerator 29 is available for use to support the endothermic reaction occurring in vessel 1. As in the case of the reactor 1, the space between $L_1$ and the top of the reactor serves as a solids separating zone in which separated solids descend to bed $C_1$. However, before these regeneration fumes are released from the regenerator they are forced through one or more solids-separating devices 31 wherein entrained solids still remaining in the fumes are removed and returned to the bed $C_1$ through one or more dip pipes $d_1$. The regeneration fumes which are drawn overhead from the regenerator 29 via line 32 are substantially freed of entrained solids and these may either be rejected from the system, or their chemical and sensible heat may be recovered by known means, as for preheating the oil feed or as mechanical energy to operate driven devices, commonly used in a plant of the kind, shown in part in the accompanying drawing. The regenerated catalyst and heat retention material or shot are withdrawn from regenerator 29 through line 33, thence through U-bend 34 and riser line 19 to reactor 1 at a point in the upper portion of bed C.

It will be understood that the apparatus layout indicated in the accompanying drawing has been simplified in the interest of clarity and to emphasize the invention. Thus a commercial plant would be provided with auxiliary equipment not shown in the drawing. For example, all standpipes, such as 27 and 35 may be provided with gas taps at spaced points, through which taps small amounts of gas may be injected into the standpipes to improve the flowability of the solids therein. Also, the well portion of the reactor 1 may be provided with a suitable packing to improve the separation of catalyst from heat retention material. A commercial plant would also be provided with various temperature and pressure automatic control devices, recording devices and otherwise supplied with known equipment to facilitate the hydroforming operation.

In order more fully to describe the present invention, the following comparative hydroforming runs are set forth. In these runs the temperature was the same in both, namely, about 900° F. in the hydroforming zones, the pressure in said zones was about 200 p.s.i., the catalyst consisted of 10% by weight of molybdenum oxide on 90 wt. percent of alumina, and the same naphtha feed was employed in both of said runs, but otherwise the two runs were conducted as below indicated:

|  | Conventional Process | According to Present Invention |
| --- | --- | --- |
| Shot | None | 10 wgts. shot per 1 wgt. catalyst in circulating stream. |
| Wgt. ratio of oil to catalyst fed to reactor 1. | 1.0 to 2.0 | 0.6 to 1.0. |
| Cubic feet H₂ per barrel oil fed to reaction zone. | 4,000 | 2,000. |
| Temperature of H₂ gas feed to reaction zone. | 1,400° F | 1,000° F. |
| Percent of heat carried into reaction zone by hot hydrogen gas. | 55% | 35%. |
| Method of heating naphtha and hydrogen gas. | Dual System heat means. | Oil and H₂ heated in single heating means. |

In the foregoing runs conditions were adjusted in each run so as to yield an 85 octane number $C_5+$ product. By using the high shot to catalyst ratio to transfer heat from the regenerator to the reactor, it was possible to reduce the recycle gas rate from 4000 to 2000 cubic feet per barrel. This effects important economies in heat transfer surface and gas compression costs. However, the lower hydrogen to oil ratio which results causes a slight increase in carbon yield from about 0.8 to about 1.1 wt. percent based on feed. The additional carbon was consumed in the regenerator, supplying an important additional fraction of heat for transfer to the hydroforming zone. The loss in liquid product, in the case where the shot was used, was of the order of 1 vol. percent.

To recapitulate briefly, the present invention involves a new and improved method for maintaining a fluidized catalyst system comprising a reaction zone and the catalyst regeneration zone in heat balance, without necessitating excessive heating of feed oil, excessive heating of recycle hydrogen-containing gas, and while maintaining a relatively low catalyst/oil ratio. The preheating of the feed oil to temperatures much above 975° F. is apt to cause a cracking, particularly, of naphthenes in the said oil. The reheating of recycle gas fed to the reactor is an expensive item because this gas is recovered from the product at a temperature about 100° F. Heretofore, it has been recommended that this gas be heated to a temperature of about 1200-1400° F., but according to the present invention, such gas may be heated to a temperature several hundred degrees below 1400° F. The result of the present improvements is to add sufficient heat to the highly endothermic hydroforming reaction by the means herein disclosed to support the said reaction without necessitating heating the feed oil to temperatures that might cause degradation of the said oil and without heating the recycle gas to 1200-1400° F., thus causing degradation of hydrocarbons including normally liquid hydrocarbons in said recycle gas. Also important economies are effected by the practice of the present invention. With respect to the relatively low catalyst/oil ratio, it is pointed out that this low catalyst/oil ratio insures less degradaion of feed in the reactor for it has been amply demonstrated that high catalyst/oil ratios or high catalyst circulation rates between the regenerator and the reactor to add heat to the latter results in the formation of inordinately large amounts of coke and gas in the reactor. While mullite has been specifically mentioned as a heat retention or heat-carrying material, it will be understood that other inert material, such as silica gel, sand, metal shot, and various other powdered inert materials may be used. Mullite is the most satisfactory material known because it is more resistant to attrition when utilized in the fluidized bed, it is inert with respect to the hydroforming reaction, and is otherwise a very satisfactory material. The particle size of the catalytic material should vary from 5 to 150 microns, and the mullite or other heat-carrying material should have a particle size of about 300 to 500 microns. With respect to the amount of hydrogen-containing gas fed to the hydroforming zone, of course, this will vary with different feeds. In general, it will be less than 4000 cubic feet of 60 to 75% hydrogen, say, from 1000 to 3500 cubic feet of such gas. The catalyst to oil ratio may vary from 0.5 to 0.9 wgt. of oil per wgt. of catalyst.

It will be understood that many various modifications of the present invention may be made by those who are familiar with the art without departing from the spirit thereof.

What is claimed is:

1. In the hydroforming of naphthas conducted under hydroforming conditions of temperature, pressure and residence time in the presence of a fluidized bed of catalyst and added hydrogen in a hydroforming zone, the improvement which comprises supplying a major portion of the heat required to support a hydroforming reaction by charging to said hydroforming zone a quantity of highly heated shot, the said shot being charged to an upper upper point in a bed of said fluidized catalyst, the said shot descending rapidly and substantially unhindered through the bed of catalyst while giving up heat to the said bed of catalyst, permitting a mixture of catalyst and shot to collect in a well disposed at the lower end of said bed of catalyst, treating the said mixture with a gasiform material to separate catalyst from the shot as a confined column, elevating the separated shot by means of a gas lift to a point at near the top of the bed of fluidized catalyst discharging the shot from said confined column at a controlled rate into an external vessel, simultaneously withdrawing a stream of catalyst containing combustible deposits from an upper point in said fluidized bed of catalyst, mixing the withdrawn shot and the withdrawn catalyst in said external vessel in the ratio of from about 6-15 weights of shot per weight of catalyst, charging the mixture to a regeneration zone, treating the mixture with an oxygen-containing gas in said regeneration zone to cause oxidative regeneration of the catalyst with the release of heat to the shot and catalyst, and returning the heated mixture to the hydroforming zone whereby the said mixture adds heat to the reaction occurring in said zone.

2. The method set forth in claim 1 in which the shot comprises mullite having a particle size of from 300–500 microns and the catalyst having a particle size of from 20–80 microns.

3. The method set forth in claim 1 in which the naphtha undergoing reforming is resident in a hydroforming zone during a period of from about 36–65 seconds.

4. The method set forth in claim 1 in which the catalyst to oil ratio fed to the hydroforming zone is from 0.6–0.9 weight of oil per weight of catalyst.

5. The method set forth in claim 1 in which about 2000 cubic feet of hydrogen-containing gas having a hydrogen concentration of from about 60–75 volume percent is fed to the reaction zone per barrel of naphtha feed.

6. The method set forth in claim 1 in which the catalyst comprises molybdenum oxide carried on alumina.

7. The method set forth in claim 1 in which the mixture of catalyst and shot is stripped in the said external vessel to dislodge hydrocarbons and hydrogen associated therewith prior to its introduction into the regeneration zone.

8. The method set forth in claim 1 in which the hydrogen and naphtha are heated in admixture to a temperature of from about 900°–1050° F. prior to their introduction into the hydroforming zone.

References Cited in the file of this patent

UNITED STATES PATENTS

| | | |
|---|---|---|
| 2,446,247 | Scheineman | Aug. 3, 1948 |
| 2,602,771 | Munday et al. | July 8, 1952 |
| 2,725,341 | Gornowski et al. | Nov. 29, 1955 |
| 2,763,595 | Fritz | Sept. 18, 1956 |